US008947796B2

(12) United States Patent
Mathai et al.

(10) Patent No.: US 8,947,796 B2
(45) Date of Patent: Feb. 3, 2015

(54) TELECENTRIC OPTICAL ASSEMBLY

(75) Inventors: Sagi Varghese Mathai, Palo Alto, CA (US); Paul Kessler Rosenberg, Sunnyvale, CA (US); Michael Renne Ty Tan, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 38 days.

(21) Appl. No.: 13/640,343

(22) PCT Filed: May 7, 2010

(86) PCT No.: PCT/US2010/034105
§ 371 (c)(1),
(2), (4) Date: Oct. 10, 2012

(87) PCT Pub. No.: WO2011/139283
PCT Pub. Date: Nov. 10, 2011

(65) Prior Publication Data
US 2013/0050841 A1 Feb. 28, 2013

(51) Int. Cl.
*G02B 7/02* (2006.01)
*G02B 13/22* (2006.01)
(Continued)

(52) U.S. Cl.
CPC .............. *G02B 13/22* (2013.01); *G02B 7/023* (2013.01); *G02B 7/003* (2013.01); *G02B 6/422* (2013.01); *H04B 10/803* (2013.01); *G02B 6/43* (2013.01)
USPC ........... 359/822; 359/819; 359/663; 356/399; 356/508; 385/14

(58) Field of Classification Search
CPC .......... G02B 7/00; G02B 7/003; G02B 7/005; G02B 7/02; G02B 7/021; G02B 7/022; G02B 6/4219; G02B 6/422; G02B 6/4226; G02B 6/4228; G02B 6/423; G02B 6/4231; G02B 7/023; H04B 10/803; H04B 10/1141; H04B 10/801

USPC ................ 356/399-401, 508, 510, 253-255; 359/811, 821, 822, 819, 820, 663; 385/14, 52, 55, 56, 58, 61, 64, 65, 74, 385/75
See application file for complete search history.

(56) References Cited

U.S. PATENT DOCUMENTS 5,568,578 A * 10/1996 Ames ............................... 385/34
5,574,814 A * 11/1996 Noddings et al. ............... 385/90
(Continued)

FOREIGN PATENT DOCUMENTS

JP 2000040714 2/2000
KR 20070113651 11/2007
(Continued)

OTHER PUBLICATIONS

Greivenkamp, John. Optical Design and Instrumentation I. Section 15: Telecentric Systems. The Univesity of Arizona, College of Optical Sciences. 2013.*
(Continued)

*Primary Examiner* — Thomas K Pham
*Assistant Examiner* — Nicholas Pasko
(74) *Attorney, Agent, or Firm* — Thorpe North & Western, LLP; Gary P. Oakeson

(57) ABSTRACT

The present disclosure provides a telecentric optical assembly comprising a first portion of a telecentric optical link including a first kinematic mount having alignment structures, where the first kinematic mount can be attached to a first substrate having a first array of active optical elements; and a second portion of the telecentric optical link including a second kinematic mount having recesses configured to mate with the alignment structures, where the second kinematic mount can be attached to a second substrate having a second array of active optical elements. Additionally, the first and second kinematic mounts, when mated, can align optical beams between the first array of active optical elements and the second array of active optical elements.

20 Claims, 5 Drawing Sheets

(51) Int. Cl.
  *G02B 6/12* (2006.01)
  *H04B 10/80* (2013.01)
  *G02B 7/00* (2006.01)
  *G02B 6/42* (2006.01)
  *G02B 6/43* (2006.01)

(56) References Cited

U.S. PATENT DOCUMENTS

| | | | |
|---|---|---|---|
| 5,748,827 A * | 5/1998 | Holl et al. | 385/134 |
| 6,243,508 B1 | 6/2001 | Jewell | |
| 6,746,172 B2 * | 6/2004 | Culpepper | 403/13 |
| 6,798,955 B2 | 9/2004 | Kunkel et al. | |
| 6,967,347 B2 | 11/2005 | Estes | |
| 7,015,454 B2 * | 3/2006 | Stone | 250/216 |
| 7,023,550 B2 | 4/2006 | Chapman | |
| 7,056,034 B2 | 6/2006 | Togami et al. | |
| 7,288,756 B2 | 10/2007 | Sherrer et al. | |
| 7,446,298 B1 * | 11/2008 | Stone | 250/216 |
| 7,676,945 B2 | 3/2010 | Prestidge | |
| 7,990,622 B2 * | 8/2011 | Conradi et al. | 359/665 |
| 8,611,758 B2 * | 12/2013 | Kuo et al. | 398/164 |
| 2001/0033720 A1 | 10/2001 | Isaksson | |
| 2002/0054410 A1 * | 5/2002 | Ishikawa et al. | 359/159 |
| 2006/0054767 A1 | 3/2006 | Kemeny | |
| 2008/0205816 A1 | 8/2008 | Lu et al. | |
| 2008/0317474 A1 * | 12/2008 | Wang et al. | 398/129 |
| 2010/0296820 A1 * | 11/2010 | Kuo et al. | 398/201 |
| 2011/0268392 A1 * | 11/2011 | Rosenberg et al. | 385/75 |

FOREIGN PATENT DOCUMENTS

WO  WO-2009136899      11/2009
WO  WO 2010050981 A1 *  5/2010

OTHER PUBLICATIONS

PCT International Search Report, Feb. 21, 2011, PCT/US2010/034105, HPDC, Filed May 7, 2010.

* cited by examiner

TELECENTRIC OPTICAL ASSEMBLY

BACKGROUND

High data rate signal transmission is a concern in many computing systems. Current server systems, for example, often use a set of user-selected components that communicate with each other at high data rates. In a computer server system designed with modular architecture incorporating individual primed circuit board (PCB) "blades," for example, the blades, e.g., server blades and/or storage blades, are mounted in a common enclosure and share system components such as cooling fans, power supplies, and enclosure management. For the blades to work together and provide the desired data storage, processing, and communications, the server system typically provides high data rate communication channels for communications among blades and external devices. Presently, blades and I/O devices in blade-type computer servers are commonly interconnected via high speed electrical connectors attached to a backplane or midplane PCB. This architecture creates signal integrity challenges since high frequency electrical signals may need to transit tens of inches of lossy copper traces, multiple PCB vias, and two or three electrical connectors before the signals reach their destinations. In addition, the backplane or midplane can block the flow of cooling air through the server enclosure, which increases the power required to cool sensitive electronic circuits. Current electrical interconnection systems also limit server design flexibility since blades typically are inserted parallel to the axis of the connector pins in a direction from front to back.

Communication channels using optical signaling can avoid many of the problems associated with high frequency electrical signals, but guided optical signaling often uses complex or cumbersome systems for reliably aligning and connecting optical cables or ribbons. For example, a typical optical fiber coupler aligns the axes of fibers being coupled and brings the ends of the fibers into contact with one another. Further, systems containing circuit boards that use optical signaling generally produce or receive optical signals at an edge of the boards where an optical cable or fiber can be connected. Having optical components at the edge of a board also has disadvantages in that some electrical signals may have to run the length of the board and may be subject to signal loss and noise problems. Further, the available space at the edge of a circuit board or a server blade is limited, and fiber connectors and the optical fibers extending from the edge of the board often compete for space with electrical sockets and cables. Accordingly, better systems and methods for economically and efficiently establishing and maintaining optical communication channels in systems such as servers would be desirable.

BRIEF DESCRIPTION OF THE DRAWINGS

Additional features and advantages of the invention will be apparent from the detailed description which follows, taken in conjunction with the accompanying drawings, which together illustrate, by way of example, features of the disclosure; and, wherein.

DETAILED DESCRIPTION

Figure 1:
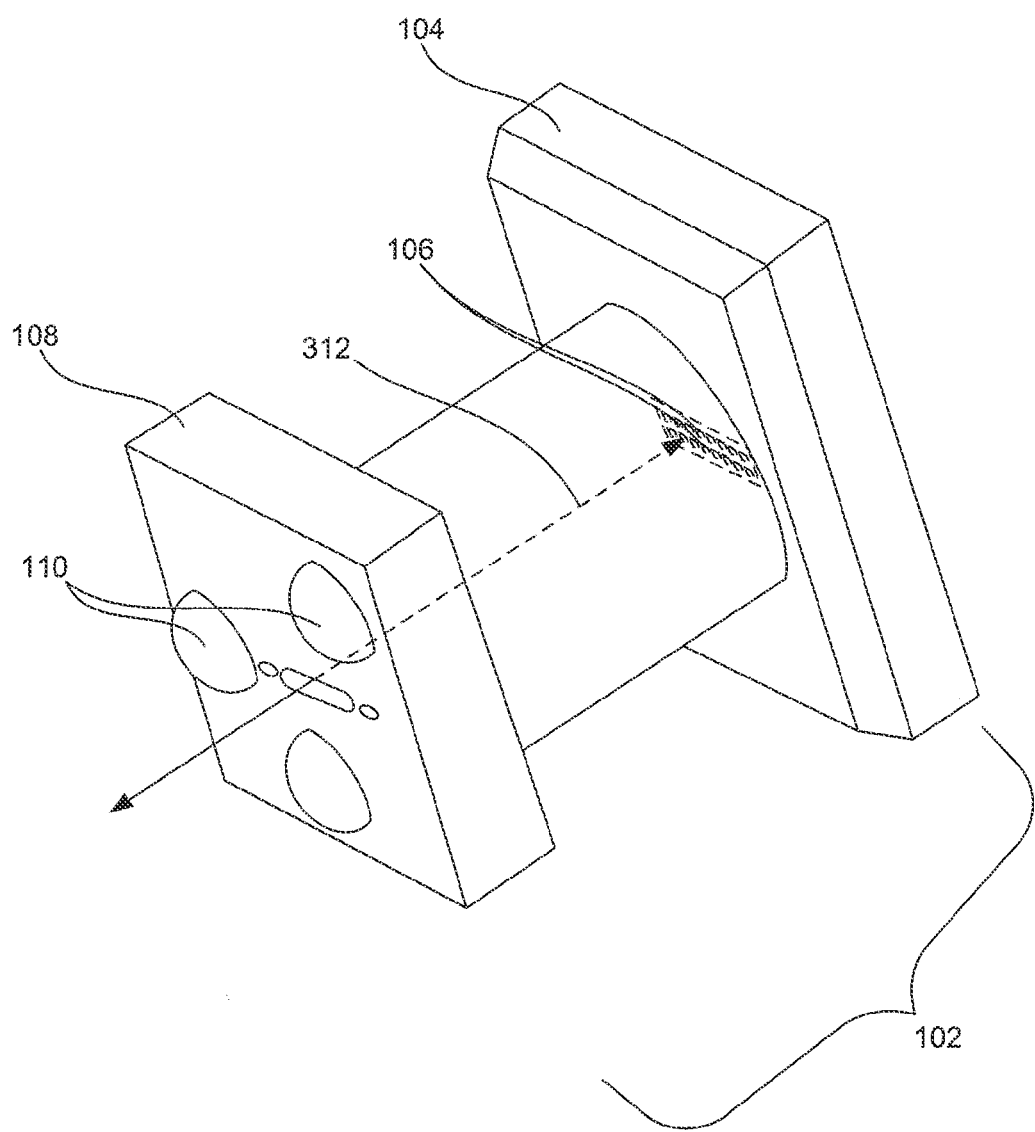
FIG. 1 is a perspective view of a first portion of a telecentric optical link and a first substrate in accordance with an example of the present disclosure.

Before the present invention is disclosed and described, it is to be understood that this invention is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It must be noted that, as used in this specification and the appended claims, the singular forms "a," "an," and "the" include plural referents unless the context clearly dictates otherwise.

As used herein, "optical cable" refers to a cable having optical fibers or optical wave guides that transmits an optical signal on to an active optical element, typically through an optical interface.

As used herein, "optics" or "optical components" generally refer to active optical elements).

As used herein, "telecentric optical alignment system" generally refers to a telecentric optical lint between a first substrate and a second substrate, where optical beams between active optical elements on the substrates are aligned.

As used herein, "telecentric optical link" generally refers to a first portion and a second portion of a telecentric optical link that can be mated via a kinematic mount such that, when the portions are attached to substrates having active optical elements, the telecentric optical link aligns optical beams between the active optical elements.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

It has been recognized that it would be advantageous to develop a telecentric optical link suitable for a wide variety of applications. In accordance with this, devices, methods, and systems described herein can include a telecentric optical link that aligns optical beams between active optical elements. As such, the present devices, methods, and systems eliminate the need to actively maintain highly precise in-plane alignment between the first portion and second portion of the telecentric optical link.

As such, a telecentric optical assembly can comprise a first portion of a telecentric optical link including a first kinematic mount having alignment structures, where the first kinematic mount can be attached to a first substrate having a first array of active optical elements. The optical assembly also comprises a second portion of the telecentric optical link including a second kinematic mount having recesses configured to mate with the alignment structures, and where the second kinematic mount can be attached to a second substrate having a second array of active optical elements. Additionally, the first and second kinematic mounts, when mated, can align optical beams between the first array of active optical elements and the second array of active optical elements.

Additionally, a method of aligning optical beams between a first array of active optical elements and a second array of active optical elements can comprise attaching a first kinematic mount of a telecentric optical link to a first substrate, where the first substrate can have the first array of active optical elements attached thereto, and attaching a second kinematic mount of the telecentric optical link to a second substrate, where the second substrate can have the second array of active optical elements attached thereto. An additional step includes mating alignment structures of the first kinematic mount to recesses of the second kinematic mount, where the recesses can be configured to mate with the alignment structures.

Further, a telecentric optical alignment system can comprise a first substrate having a first array of active optical elements, and a first portion of a telecentric optical link including a first kinematic mount having alignment structures, where the first kinematic mount can be attached to the first substrate. The system further comprises a second substrate having a second array of active optical elements, and a second portion of the telecentric optical link including a second kinematic mount having recesses configured to mate with the alignment structures, where the second kinematic mount can be attached to the second substrate. Additionally, the first and second kinematic mounts, when mated, can align optical beams between the first array of active optical elements and the second array of active optical elements.

It is noted that when describing a telecentric optical link, a method using such a device, or a system using such a device, each of these descriptions can be considered applicable to each of these examples, whether or not they are explicitly discussed in the context of that example. For example, in discussing alignment structures for a telecentric optical link, those alignment structures can also be used in a method or system using the telecentric optical link, and vice versa.

Various modifications and combinations that can be derived from the present disclosure and illustrations, and as such, the following figures should not be considered limiting.

Turning now to FIG. 1, a first portion of a telecentric optical link 102 can be attached to a first substrate 104. The first substrate can have a first array of active optical elements 106. The first array of active optical elements can be selected from the group consisting of receivers, transmissions sources, optical modulators, optoelectronic integrated circuits, and combinations thereof. In one example, the second array of active optical elements can be selected from the group consisting of lasers, photodetectors, optoelectronic integrated circuits and combinations thereof. The first portion of the telecentric optical link can have a first kinematic mount 108 having alignment structures 110. In one example, the first kinematic mount can have at least three alignment structures. Generally, the alignment structures can be any shape and size. In one example, the alignment structures can be spherical, e.g., semi-spherical bumps that protrude from the first kinematic mount.

While the present FIGS. show a 2D array of active optical elements, in one example, the arrays described herein can include 1D arrays of active optical elements as well. Additionally, while the arrays of optical active elements can be independently selected from the group consisting of receivers, transmissions sources, optical modulators, optoelectronic integrated circuits, and combinations thereof, typically, the telecentric active assemblies comprises at least one photodetector and one laser such that the optical link provides alignment between the active optical elements such that optical beams 312 that are transmitted between the active optical elements are aligned allowing communication between the substrates, though this is not required.

Figure 2:
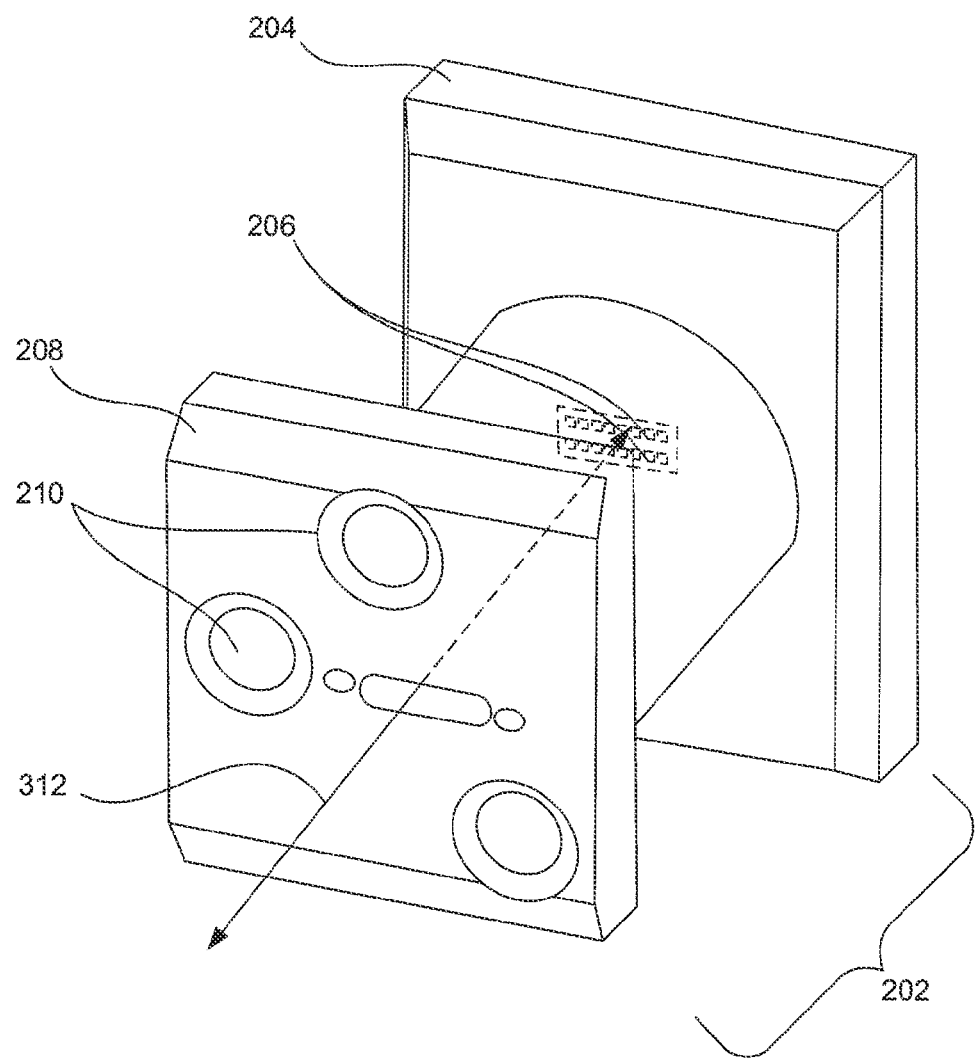
FIG. 2 is a perspective view of a second portion of a telecentric optical link and a second substrate in accordance with an example of the present disclosure.

Turning now to FIG. 2, a second portion of a telecentric optical link 202 can be attached to a second substrate 204. The second substrate can have a second array of active optical elements 206. The second array of active optical elements can be selected from the group consisting of receivers, transmissions sources, optical modulators, optoelectronic integrated circuits, and combinations thereof. In one example, the second array of active optical elements can be selected from the group consisting of lasers, photodetectors, optoelectronic integrated circuits, and combinations thereof. The second portion of the telecentric optical link can have a second kinematic mount 208 having recesses 210. In one example, the second kinematic mount can have at least three recesses. Generally, the recesses can be any shape and size. In one example, the recesses can be semi-spherical for receiving semi-spherical alignment structures (now shown in FIG. 2, denoted in FIG. 1 as 110). Generally, the recesses can be configured to mate with the alignment structures. Any other appropriate shape can be used for the alignment structures and recesses, as long as they provide appropriate mating properties to prevent movement. As with FIG. 3, optical beams 312 are shown as they would be passed within the device through free space, as opposed to through optical cables or waveguides. In one example, alignment can also be produced with two alignment structures and two recesses, e.g., pins in cylinders.

With specific reference to the receivers on both portions of the assembly, the receivers can be selected from the group consisting of optical detectors, chemical detectors, photoresistors, photovoltaic cells, photodiodes, phototransistors, and combinations thereof. Regarding the transmission sources, they can be selected from the group of vertical cavity surface emitting lasers, fabry-perot lasers, distributed feedback lasers, light emitting diodes, and combinations thereof. Generally, the substrates can be circuit boards including printed circuit boards. In one example, the circuit board can be a blade. In another example, the circuit board can be a midplane. In yet another example, the circuit board can be a backplane. In another example, the circuit board can be an interposer board. In yet another example, the circuit board can be a flex circuit.

Figure 3:
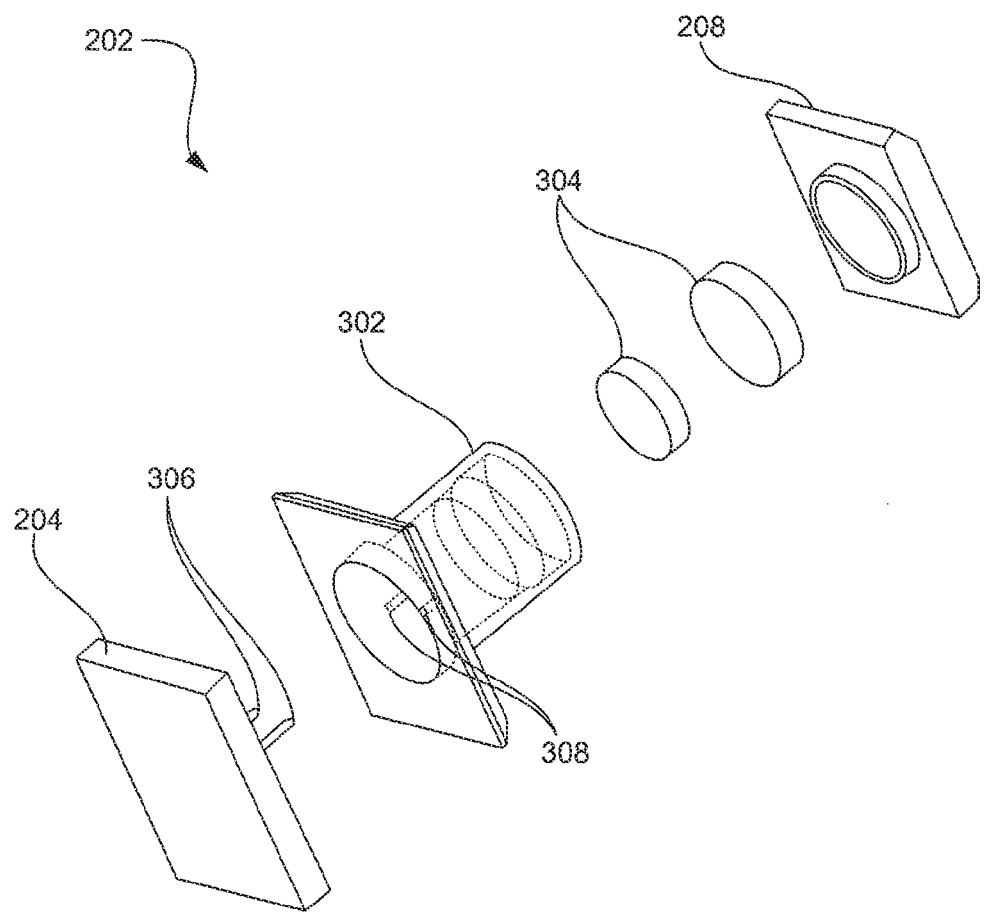
FIG. 3 is an exploded view of a second portion of a telecentric optical link and a second substrate in accordance with an example of the present disclosure.

Turning now to FIG. 3, in further detail, an exploded view of the second portion of a telecentric optical link 202 is shown, and can include a lens tube 302 containing at least one lens 304. A kinematic mount 208, as described previously is also shown. In one example, the lens tube can contain at least two lenses, as shown. In another example, the lens tube can be located between the second substrate 204 and the second kinematic mount (as shown in FIG. 3). In yet another example, the lens tube can be located between the first substrate and the first kinematic mount (not shown). In yet another example, at least one lens tube can be located between the first substrate and first kinematic mount and the second substrate and second kinematic mount. Additionally, the second substrate can included guide pins 306 and the second portion of the telecentric optical link can have guide holes 308 configured to receive the guide pins. The guide pins and guide holes can allow for a precise alignment of the lens tube between the first and second substrates. Although, FIG. 3 shows guide pins and guide holes for the second substrate and second portion of the telecentric optical link, it is understood that such structures can also be present on the first substrate and first portion of the telecentric optical link. Additionally, it is noted, that the guide pins can be co-molded with the lens tube (and/or lenses) to save assembly steps. The present examples can provide optical alignment precision for both multimode alignment with a radial positioning accuracy of less than 5 microns and/or single mode alignment with a radial positioning accuracy of less than 1 micron.

Figure 4:
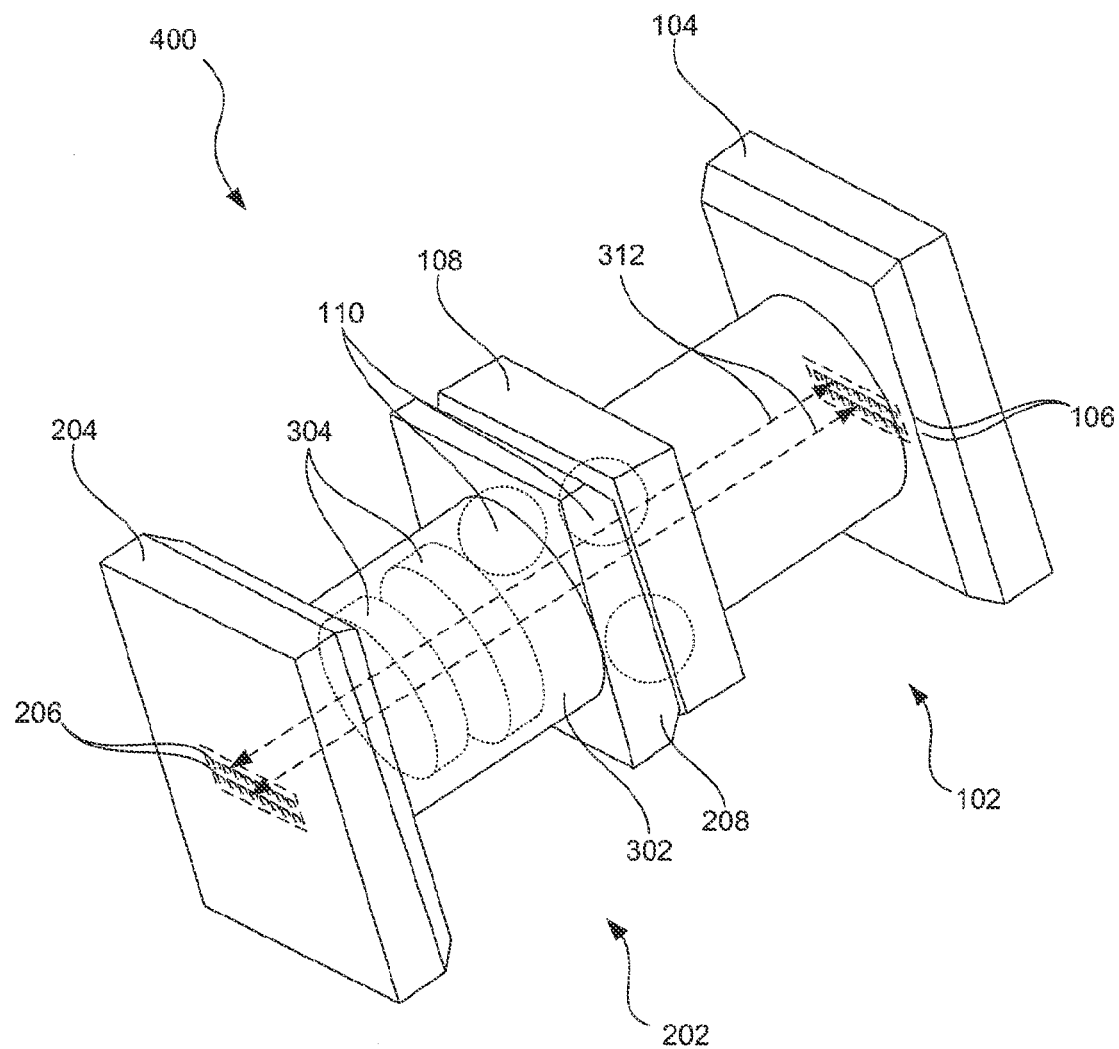
FIG. 4 is a perspective view of a telecentric optical alignment system in accordance with an example of the present disclosure.

Turning now to FIG. 4, a telecentric optical alignment system 400 can comprise a first substrate 104 having a first array of active optical elements 106; and a first portion of a telecentric optical link 102 including a first kinematic mount 108 having alignment structures 110, the first kinematic mount attached to the first substrate. In the embodiment shown, the alignment structures are shown as spherical, with a semi-spherical bump protruding from a surface of the kinematic mounts. The system also includes a second substrate 204 having a second array of active optical elements 206; and a second portion of the telecentric optical link 202 including a second kinematic mount 208 having recesses (shown receiving the alignment structures, but more specifically shown in FIG. 2 at 210) configured to mate with the alignment structures. The second kinematic mount can be attached to the second substrate. The first and second kinematic mounts, when mated, can provide precise and fault-tolerant alignment of optical beams 312 between the first array of active optical elements 106 and the second array of active optical elements 206. The kinematic mounts can allow for aligning the portions of the telecentric optical link as shown in FIG. 4. Additionally, optical beams transmitted between the active optical elements can be aligned through free space as compared to the use of fiber optical cables. Furthermore, as shown in previous FIGS., a lens tube 302 surrounding at least one lens 304 can also be present.

The telecentric optical assemblies can be used in a variety of applications. In one example, the telecentric optical assemblies can be used in a blade to blade application. In another example, the telecentric optical assemblies can be used in a blade to midplane application. In yet another example, the telecentric optical assemblies can be used in a blade to backplane application. Additionally, in one example, the orientation of the telecentric link can be normal, or perpendicular, to the blade or PCB. In another example, the orientation of the telecentric link can be in line, or parallel, to the blade or PCB.

Figure 5:
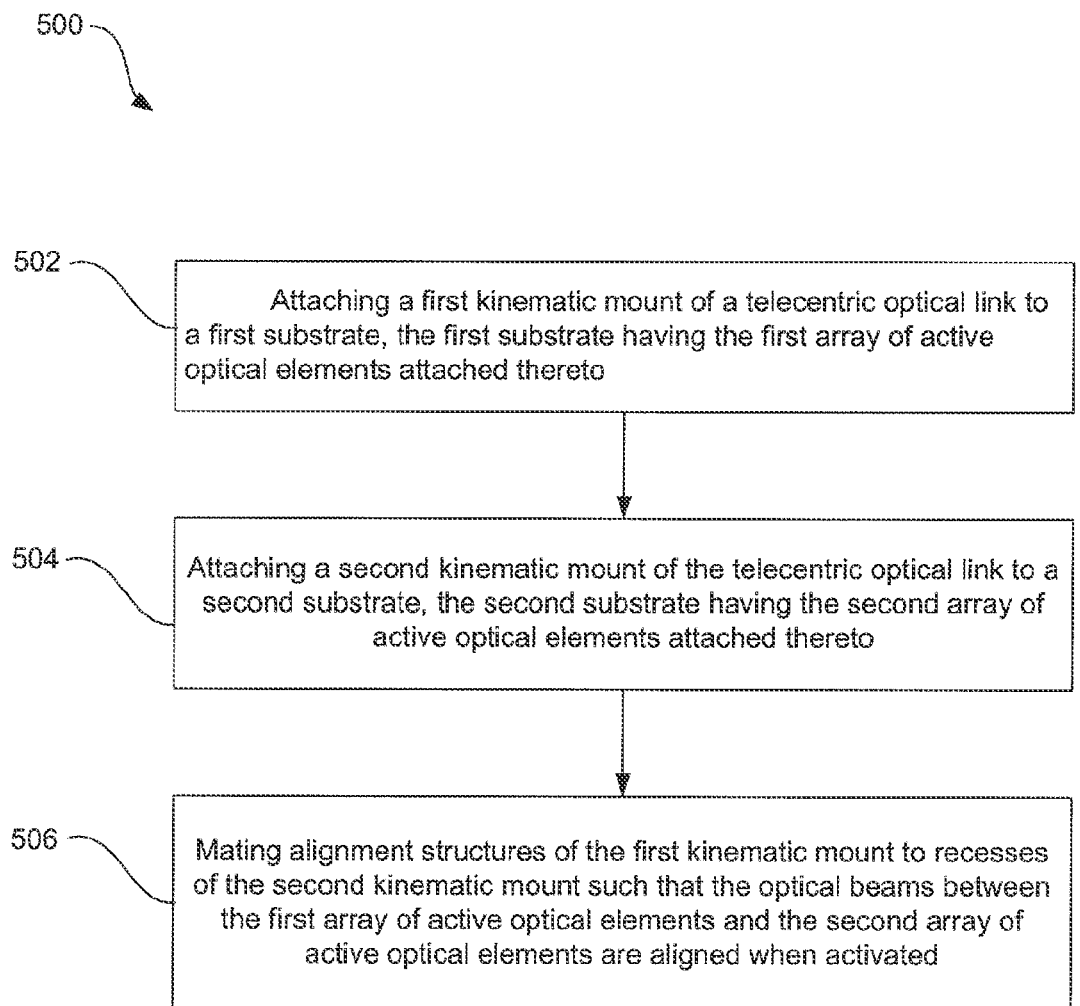
FIG. 5 is a flow chart of a method in accordance with an example of the present disclosure.

Turning now to FIG. 5, a method of aligning optical beams between a first array of active optical elements and a second array of active optical elements 500 can comprise attaching 502 a first kinematic mount of a telecentric optical link to a first substrate, where the first substrate can have the first array of active optical elements attached thereto, and attaching 504 a second kinematic mount of the telecentric optical link to a second substrate, where the second substrate can have the second array of active optical elements attached thereto. An additional step includes mating 506 alignment structures of the first kinematic mount to recesses of the second kinematic mount, such that the optical beams between the first array of active optical elements and the second array of active optical elements are aligned when activated. In one example, the alignment can be passive in that it does not rely on traditional active alignment methods, such as visual inspection or active feedback.

Additionally, the step of attaching the first portion of the kinematic mount to the first substrate can be performed using guide pins located on the first substrate and guide holes located on the first portion of the telecentric optical link, wherein the guide holes are configured to receive the guide pins. It is noted that guide pin can refer to any type of alignment feature. Further, the step of attaching the second portion of the kinematic mount to the second substrate can be performed using guide pins located on the second substrate and guide holes located on the second portion of the telecentric optical link, wherein the guide holes are configured to receive the guide pins. Further, the active optical elements can be aligned with their respective guide pins such that upon mating of the alignment structures to the recesses, the telecentric optical assemblies described herein can be passively aligned. In one example, the guide pins can be precisely aligned with respect to the active components on their respective substrates. In one example, "precisely aligned" for a multimode alignment can include a radial positioning accuracy of less than 5 microns and/or for a single mode alignment can include a radial positioning accuracy of less than 1 micron. It is understood that the above steps can be performed sequentially or simultaneously and are not required to be performed as listed, but may be performed in any order. In one example, the steps may be performed sequentially as listed. In another example, the steps may be performed sequentially in any order.

In accordance with other embodiments, the optical beams can be aligned through free space when activated. This is advantageous because complicated attachment of optical cables such as fiber optics or waveguides can be avoided. Using optical fibers often requires the use of more complicated optical connectors, whereas the telecentric assemblies of the present disclosure enable connecting various components easily and simply by utilizing free space between optical elements. Thus, the system described herein can be made to be modular, with interchangeable telecentric optical link portions.

Furthermore, the method described herein can also comprise the step of activating the optical beams between the first array of active optical elements and the second array of active optical elements. In this embodiment, the active optical elements become optically connected to one another using transmission source such as lasers, receivers such as photodetectors, or the like.

In summary and to reiterate to some degree, the present disclosure provides a telecentric optical link for aligning active optical elements. It is noted that these methods, devices, and systems can be modified independently of one another. Additionally, the present devices, methods, and systems can provide for increased functionality and decreased cost as the telecentric optical link can provide a precise alignment, thereby eliminating the need for active alignment components/assembly steps. Additionally, the alignment can be passive.

While the disclosure has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:
1. A telecentric optical assembly, comprising:
  a first portion of a telecentric optical link including a first kinematic mount having alignment structures, the first kinematic mount attached to a first substrate having a first array of active optical elements;
  a second portion of the telecentric optical link including a second kinematic mount having recesses configured to mate with the alignment structures, the second kinematic mount attached to a second substrate having a second array of active optical elements;

wherein the first and second kinematic mounts, when mated, align optical beams between the first array of active optical elements and the second array of active optical elements.

2. A method of aligning optical beams between a first array of active optical elements and a second array of active optical elements, comprising:

attaching a first kinematic mount of a telecentric optical link to a first substrate, the first substrate having the first array of active optical elements attached thereto;

attaching a second kinematic mount of the telecentric optical link to a second substrate, the second substrate having the second array of active optical elements attached thereto; and mating alignment structures of the first kinematic mount to recesses of the second kinematic mount such that the optical beams between the first array of active optical elements and the second array of active optical elements are aligned when activated.

3. A telecentric optical alignment system, comprising:
a first substrate having a first array of optical elements;
a first portion of a telecentric optical link including a lens tube containing two lenses of a compound telecentric lens and a first kinematic mount having alignment structures, the first kinematic mount attached at one end of the lens tube, the other end of the lens tube being attached to a first substrate having a first array of optical elements;
a second substrate having a second array of optical elements; and
a second portion of the telecentric optical link including a second kinematic mount having recesses configured to mate with the alignment structures of the first kinematic mount, the second portion of the telecentric optical link attached to the second substrate having a second array of optical elements;
wherein the first and second kinematic mounts, when mated, align optical beams between the first array of optical elements and the second array of optical elements.

4. The telecentric optical assembly of claim 1, wherein the first kinematic mount has at least three semi-spherical alignment structures protruding from a surface of the first kinematic mount and the second kinematic mount has at least three corresponding semi-spherical recesses.

5. The telecentric optical assembly of claim 1, further comprising a lens tube surrounding two lenses, wherein the lens tube is located between the first substrate and the first kinematic mount or the second substrate and the second kinematic mount.

6. The telecentric optical assembly of claim 1, wherein the first array of the active optical elements and the second array of the active optical elements are independently selected from the group consisting of transmission sources, receivers, optical modulators, optoelectronic integrated circuits, and combinations thereof.

7. The telecentric optical assembly of claim 1, wherein the alignment structures protrude from the first kinematic mount, and are semi-spherical.

8. The telecentric optical assembly of claim 1, wherein the first substrate has guide pins and the first portion of the telecentric optical link has guide holes configured to receive the guide pins.

9. The telecentric optical assembly of claim 1, wherein the second substrate has guide pins and the second portion of the telecentric optical link has guide holes configured to receive the guide pins.

10. The telecentric optical assembly of claim 1, wherein the optical beams are aligned between the first and second arrays of optical elements through predominantly free space.

11. The telecentric optical assembly of claim 1, wherein said first and second kinematic mounts, when mated, are disposed along an optical path between said first and second substrates, but spaced apart from both said first and second substrates.

12. The method of claim 2,
wherein attaching the first portion of the kinematic mount to the first substrate is performed using guide pins located on the first substrate, the guide pins being precisely aligned with respect to the active components on the first substrate, and guide holes located on the first portion of the telecentric optical link, wherein the guide holes are configured to receive the guide pins; or
wherein attaching the second portion of the kinematic mount to the second substrate is performed using guide pins located on the second substrate, the guide pins being precisely aligned with respect to the active components on the second substrate, and guide holes located on the second portion of the telecentric optical link, wherein the guide holes are configured to receive the guide pins.

13. The method of claim 2, wherein the optical beams are aligned through an optical path that is predominantly free space when activated.

14. The method of claim 2, further comprising the step of activating the optical beams between the first array of active optical elements and the second array of active optical elements.

15. The telecentric optical alignment system of claim 3, wherein the first substrate has guide pins, the guide pins being precisely aligned with respect to the active components on the first substrate, and the first portion of the telecentric optical link has guide holes configured to receive the guide pins, or the second substrate has guide pins, said the pins being precisely aligned with respect to the active components on the second substrate, and the second portion of the telecentric optical link has guide holes configured to receive the guide pins.

16. The telecentric optical assembly of claim 3, wherein said second portion of the telecentric optical link comprises a second lens tube containing lenses of a compound telecentric lens, the second kinematic mount attached at one end of the second lens tube, the other end of the second lens tube being attached to the second substrate over the second array of optical elements.

17. The telecentric optical assembly of claim 3, wherein the first kinematic mount has at least three alignment structures and the second kinematic mount has at least three corresponding recesses.

18. The telecentric optical assembly of claim 3, wherein the alignment structures are semi-spherical bumps protruding from a surface of the first kinematic mount.

19. The telecentric optical assembly of claim 3, wherein the first portion of the telecentric optical link and the first array of optical elements are aligned with guide pins matching corresponding guide holes.

20. The telecentric optical assembly of claim 11, further comprising first and second lens tubes, each lens tube being in the spacing between either the first kinematic mount and first substrate or the second kinematic mount and the second substrate.

* * * * *